United States Patent
Jones et al.

(10) Patent No.: US 11,841,465 B1
(45) Date of Patent: Dec. 12, 2023

(54) WIRELESS POWER TRANSFER VIA ROTARY LINK

(71) Applicant: Waymo LLC, Mountain View, CA (US)

(72) Inventors: Joshua Jones, Mountain View, CA (US); Gregory Hall, Mountain View, CA (US); Alexander Zbrozek, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 527 days.

(21) Appl. No.: 17/137,347

(22) Filed: Dec. 29, 2020

Related U.S. Application Data

(60) Provisional application No. 62/954,912, filed on Dec. 30, 2019.

(51) Int. Cl.
*G01S 7/4861* (2020.01)
*G01S 17/931* (2020.01)
(Continued)

(52) U.S. Cl.
CPC .......... *G01S 7/4861* (2013.01); *G01S 17/931* (2020.01); *H02J 50/12* (2016.02); *H02J 50/80* (2016.02)

(58) Field of Classification Search
CPC ...... G01S 7/4861; G01S 17/931; H02J 50/12; H02J 50/80
(Continued)

(56) References Cited

U.S. PATENT DOCUMENTS

| 4,808,868 A | 2/1989 | Roberts |
| 5,132,617 A | 7/1992 | Leach et al. |

(Continued)

FOREIGN PATENT DOCUMENTS

| CN | 109889036 A | * | 6/2019 | ............ Y02E 60/10 |
| EP | 3179622 A1 | * | 6/2017 | ............ H02M 3/338 |

OTHER PUBLICATIONS

G. Rizzoli, M. Mengoni, L. Zarri and A. Tani, "Voltage Feedback of an LLC Resonant Converter with a Rotary Transformer," IECON 2018—44th Annual Conference of the IEEE Industrial Electronics Society, Washington, DC, USA, 2018, pp. 1568-1573, doi: 10.1109/IECON.2018.8592682. (Year: 2018).*

(Continued)

*Primary Examiner* — M Baye Diao
(74) *Attorney, Agent, or Firm* — McDonnell Boehnen Hulbert & Berghoff LLP

(57) ABSTRACT

A method for operating a light detection and ranging (LIDAR) device is provided. The method includes driving, by an LLC resonant power converter, a wireless power signal at a primary winding of a transformer disposed on a first platform. The method includes transmitting the wireless power signal across a gap separating the first platform and a second platform. The second platform is configured to rotate relative to the first platform. The method includes receiving the wireless power signal at a secondary winding of the transformer. The secondary winding is disposed on the second platform. The method includes operating, by the LLC resonant power converter at a unity gain operating point and in an open loop mode without feedback control, a device mounted on the second platform based on the secondary winding receiving the wireless power signal.

20 Claims, 10 Drawing Sheets

(51) Int. Cl.
*H02J 50/80* (2016.01)
*H02J 50/12* (2016.01)

(58) Field of Classification Search
USPC ........................................................ 320/108
See application file for complete search history.

(56) References Cited

U.S. PATENT DOCUMENTS

| | | | |
|---|---|---|---|
| 5,757,157 A | 5/1998 | Falk et al. | |
| 6,860,159 B2 | 3/2005 | Jin et al. | |
| 7,690,788 B2 | 4/2010 | Yamada et al. | |
| 9,257,913 B1* | 2/2016 | McDonald | H02M 3/3376 |
| 9,685,825 B2 | 6/2017 | Shimokawa | |
| 10,264,650 B2 | 4/2019 | Jungwirth | |
| 10,277,084 B1* | 4/2019 | Karplus | H02K 11/20 |
| 10,277,890 B2 | 4/2019 | Kerstein | |
| 10,320,243 B2 | 6/2019 | Tokura et al. | |
| 10,340,807 B2* | 7/2019 | Chen | H02M 3/33546 |
| 10,369,891 B2 | 8/2019 | Elshaer et al. | |
| 10,749,308 B2* | 8/2020 | Pardhan | H05K 7/2039 |
| 2010/0038970 A1 | 2/2010 | Cook et al. | |
| 2013/0294113 A1* | 11/2013 | Liang | H02M 3/3382 363/20 |
| 2014/0252813 A1 | 9/2014 | Lee et al. | |
| 2014/0354225 A1 | 12/2014 | Kitamura | |
| 2017/0331383 A1* | 11/2017 | Hsiao | H02M 3/33571 |
| 2018/0123412 A1 | 5/2018 | Karplus et al. | |

OTHER PUBLICATIONS

Designing an LLC Resonant Half-Bridge Power Converter 2010 Texas Instruments Power Supply Design Seminar SEM1900, Topic 3 (Year: 2010).*

Deng et al., "Design Methodology of LLC Resonant Converters for Electric Vehicle Battery Chargers," IEEE Transactions on Vehicular Technology, vol. 63, No. 4, May 2014.

Abdel-Rahman, "Resonant LLC Converter: Operation and Design," Infineon Technologies North America (IFNA) Corp., Application Note AN 2012-09, Sep. 2012.

* cited by examiner

WIRELESS POWER TRANSFER VIA ROTARY LINK

CROSS-REFERENCE TO RELATED APPLICATIONS

This application claims priority to U.S. Provisional Patent Application No. 62/954,912, filed Dec. 30, 2019, which is incorporated herein by reference in its entirety and for all purposes.

BACKGROUND

Unless otherwise indicated herein, the materials described in this section are not prior art to the claims in this application and are not admitted to be prior art by inclusion in this section.

Light detection and ranging (LIDAR) devices may estimate distances to objects in a given environment. For example, an emitter subsystem of a LIDAR device may emit light pulses, which may interact with objects in the device's environment. At least a portion of the light pulses may be redirected back toward the LIDAR (e.g., due to reflection or scattering) and detected by a detector subsystem. LIDAR devices may direct light pulses by orienting light emitters using a movable platform. Maintaining a power signal to the LIDAR device through the movable platform using a wired connection may be impractical. Accordingly, LIDAR devices can receive power via wireless connections.

SUMMARY

In one example, a method for operating a light detection and ranging (LIDAR) device is provided. The method includes driving, by an LLC resonant power converter, a wireless power signal at a primary winding of a transformer disposed on a first platform. The method includes transmitting the wireless power signal across a gap separating the first platform and a second platform. The second platform is configured to rotate relative to the first platform. The method includes receiving the wireless power signal at a secondary winding of the transformer. The secondary winding is disposed on the second platform. The method includes operating, by the LLC resonant power converter at a unity gain operating point and in an open loop mode without feedback control, a device mounted on the second platform based on the secondary winding receiving the wireless power signal.

In another example, a system is provided. The system includes a first platform. The system includes a second platform spaced apart from the first platform by a gap. The second platform is configured to rotate relative to the first platform. The system includes a device mounted to the second platform. The system includes an LLC resonant power converter configured to operate the device at a unity gain operating point and in an open loop mode without feedback control. The LLC resonant power converter includes a transformer that has a primary winding and a secondary winding, the primary winding is disposed on the first platform, the secondary winding is disposed on the second platform, and the primary winding is configured to transmit a wireless power signal to the secondary winding across the gap separating the first platform and a second platform.

In another example, a light detection and ranging (LIDAR) device mounted to a structure is provided. The LIDAR device includes a first platform coupled to a structure. The LIDAR device includes a second platform spaced apart from the first platform by a gap. The second platform is configured to rotate relative to the first platform. The LIDAR device includes an LLC resonant power converter configured to operate the LIDAR device at a unity gain operating point and in an open loop mode without feedback control. The LLC resonant power converter includes a transformer that has a primary winding and a secondary winding, the primary winding is disposed on the first platform, the secondary winding is disposed on the second platform, and the primary winding is configured to transmit a wireless power signal to the secondary winding across the gap separating the first platform and a second platform.

In another example, a system is provided. The system includes means for driving a wireless power signal at a primary winding of a transformer disposed on a first platform. The system includes means for transmitting the wireless power signal across a gap separating the first platform and a second platform. The second platform is configured to rotate relative to the first platform. The system includes means for receiving the wireless power signal at a secondary winding of the transformer. The secondary winding is disposed on the second platform. The system includes means for operating, at a unity gain operating point and in an open loop mode without feedback control, a device mounted on the second platform based on the secondary winding receiving the wireless power signal.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
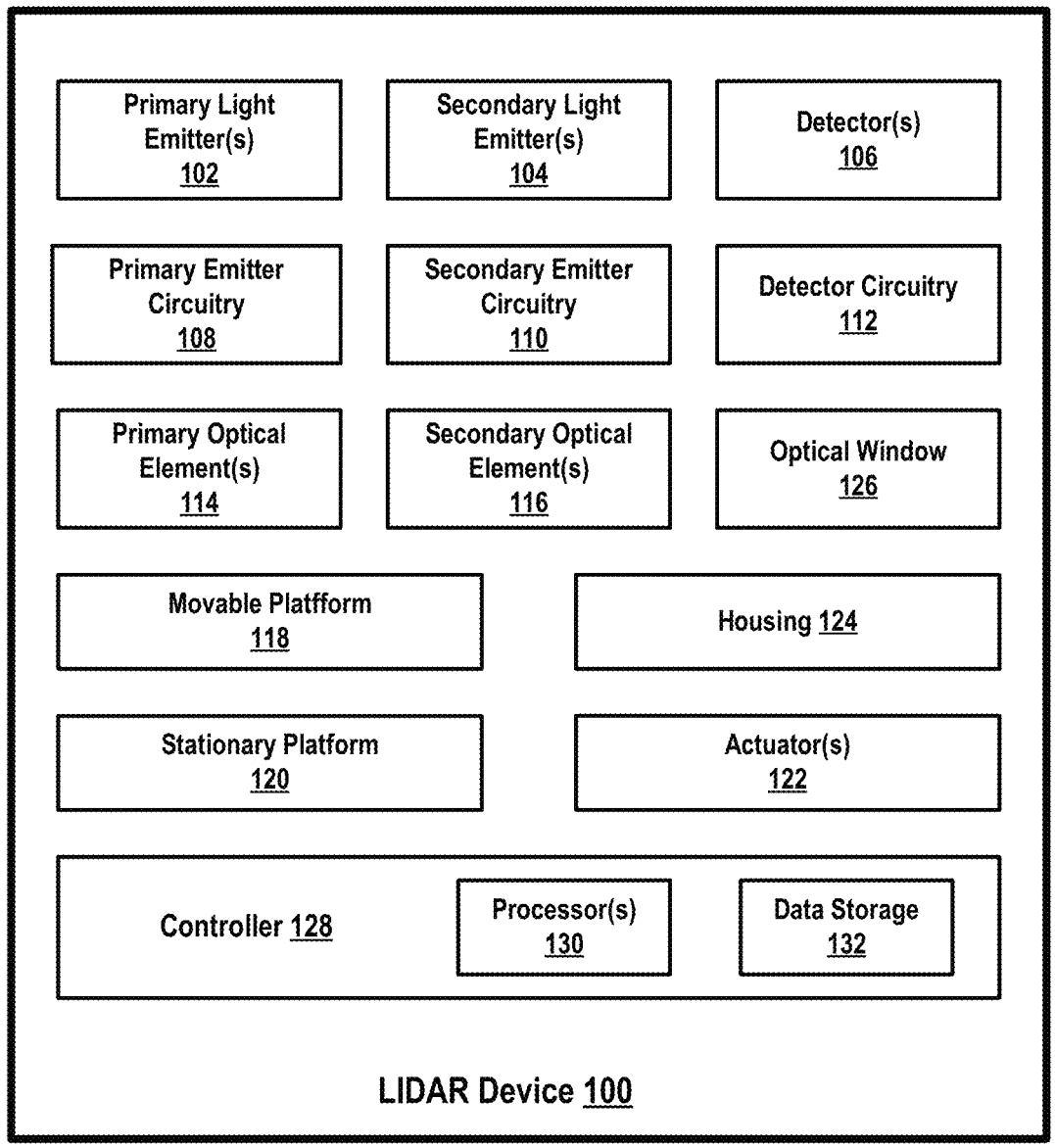
FIG. 1 is a simplified block diagram of a LIDAR device, according to an example embodiment.

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein and illustrated in the figures, can be arranged, substituted, combined, separated, and designed in a wide variety of different configurations.

I. OVERVIEW

A light detection and ranging (LIDAR) device may include one or more light emitters configured to emit light pulses into an environment of the LIDAR device and one or more detectors configured to detect returning light pulses that correspond to reflections of the emitted light pulses by one or more objects in the environment. A time difference between a time when a light pulse is emitted and a time when a reflection of the light pulse is detected can be used to determine a distance between the LIDAR device and an object that reflected the light pulse. In addition, a direction to the object can be determined based on the direction in which the light emitter emitted the light pulse. The direction to the object could be characterized, for example, in terms of an azimuthal or yaw angle (e.g., an angle in a horizontal plane) and/or an elevational angle (e.g., an angle with respect to a horizontal plane).

In some implementations, a LIDAR device may emit and detect light pulses in successive measurement periods. Each measurement period may include an emission period in which the light emitter emits a light pulse followed by a detection period in which the detector "listens" for any returning light pulses. In some embodiments, the direction in which the light emitter emits the light pulse may change from one measurement period to another (e.g., due to rotation or other motion of the LIDAR device, deflection by a mirror or other beam-steering device, or in some other manner). In this way, the LIDAR device may scan a portion of its environment.

The LIDAR device consumes power in order to scan the environment in this manner. However, wired power connections may be impractical in certain contexts. For example, a wired connection may experience wear or rapid degradation when connected to a movable platform (e.g., a rotating or pivoting platform). Accordingly, example embodiments include a wireless power transfer system for a LIDAR device. The system can include an LLC resonant power converter that is split between a first circuit (e.g., a tank circuit having an inductor and a capacitor) that provides a wireless power signal to a primary winding of a transformer and a second circuit that receives the wireless power signal from a secondary winding of the transformer. The first circuit can be embedded in a first platform that is stationary relative to the system and the second circuit can be embedded in a second platform configured to rotate relative to the first platform. The first platform and the second platform can be separated by a gap and oriented such that the wireless power signal can transfer from the primary winding of the transformer across the gap to the secondary winding of the transformer. This received wireless power signal can be used to reliably and consistently provide power to the LIDAR device.

By controlling an input voltage and an operating point of the resonant circuit, the output voltage may be controlled in a synchronous manner. In some embodiments, the resonant circuit can be operated at a unity gain operating point. For example, a fixed, or nearly-fixed, frequency can be used in an input signal for the LLC circuit. This operating point can be configured such that power-transfer characteristics of the system experience only minor variations when a load of the secondary winding changes or a gap between platforms changes. Accordingly, examples are described that allow for consistent and robust power transfer characteristics for a LIDAR device. In some embodiments, the wireless power circuit may not have a closed loop feedback circuit. This can be a result of the fixed operating point, which allows for predictable power transfer to the secondary winding even if a load or gap change occurs. This may allow for additional communication bandwidth between the first platform and the second platform by removing feedback signals relating to power transfer at the second platform.

LIDAR devices may consume power differently at different times or in different contexts. For example a LIDAR device may operate in a normal mode and a power-saving mode, which have different power consumption characteristics. Accordingly, a wireless power transfer system can provide different power levels in accordance with power consumption demands of the LIDAR device. Additionally, LIDAR devices may have maximum power consumption ratings. Accordingly, a wireless power transfer system can power the LIDAR device in accordance with the maximum power consumption ratings.

Within examples, the LIDAR device is disposed on a vehicle. In these examples, the stationary platform and first circuit may be coupled to a portion of the vehicle and receive an initial power signal from a common power bus of the vehicle. The initial power signal may be pre-regulated for transmission to the LIDAR device. In further examples involving a vehicle, a gap between a stationary platform mounted to the vehicle and a movable platform of the LIDAR device may correspond to a gap between the primary winding and secondary winding of the transformer of the LLC resonant power converter. In some embodiments, the wireless power circuit could operate relatively independent of a varying gap in a toroidal transformer of the stationary platform and/or movable platform, which is configured to rotate with respect to the rotary link.

II. EXAMPLE SYSTEMS

FIG. 1 is a simplified block diagram of a LIDAR device 100, according to example embodiments. As shown, LIDAR device 100 includes one or more primary light emitters 102, one or more secondary light emitters 104, one or more detectors 106, primary emitter circuitry 108, secondary emitter circuitry 110, detector circuitry 112, one or more primary optical elements 114, one or more secondary optical elements 116, an optical window 118, a housing 120, a movable platform 122, a stationary platform 124, one or more actuators 126, and a controller 128. In some embodiments, system 100 may include more, fewer, or different components. Additionally, the components shown may be combined or divided in any number of ways.

The primary light emitter(s) 102 are configured to emit light, for example, in the form of pulses. Each light pulse could have a duration that is suitable for determining distances to objects in the environment. For example, each light pulse could have a duration that is between 2 nanoseconds and 5 nanoseconds. Other pulse durations are possible as well. The light emitted by the primary light emitter(s) 102 could have a narrow range of wavelengths. For example, the primary light emitter(s) 102 could include laser diodes, laser diode bars, vertical cavity surface emitting lasers (VCSEL), fiber lasers, or other narrowband light sources. Alternatively, the primary light emitter(s) 102 could emit light with a broader range of wavelengths. For example, the primary light emitter(s) 102 could include light emitting diodes (LEDs). Other types of light sources are possible as well. The wavelengths emitted by the primary light emitter(s) 102 could be, for example, in the ultraviolet, visible, and/or infrared portions of the electromagnetic spectrum. In an example embodiment, the primary light emitter(s) 102 include laser diodes that emit light at a wavelength of about 905 nanometers or about 1550 nanometers.

In some embodiments, LIDAR device 100 may include only one primary light emitter 102. In other embodiments, LIDAR device 100 may include a plurality of primary light emitters 102. Each primary light emitter in the plurality of primary light emitters 102 may be configured to emit light that illuminates a respective field of view, for example, based on a location of the primary light emitter relative to the primary optical element(s) 114. The respective fields of view of the primary light emitters 102 could be either overlapping or non-overlapping.

The secondary light emitter(s) 104 are configured to emit light, for example, in the form of pulses. The light pulses emitted by the secondary light emitter(s) 104 could have the same or similar duration as the light pulses emitted by the primary light emitter(s) 102, but could have a higher or lower pulse energy. For example, a primary light emitter 102 may emit light pulses with a pulse energy of about 76 nJ, whereas a secondary light emitter 104 may emit light pulses with a pulse energy of about 1 µJ. Although the pulse energy may be higher, the intensity of the light from a secondary light emitter 104 may be lower than that of a primary light emitter 102 because the light from the secondary light emitter 104 may be spread out over a wider field of view (e.g., by the secondary optical element(s) 116). The wavelengths of light emitted by the secondary light emitter(s) 104 could be the same as or similar to the wavelengths of light emitted by the primary light emitter(s) 102. In an example embodiment, both the primary light emitter(s) 102 and the secondary light emitter(s) 104 emit light in the near-infrared range. Like the primary light emitter(s) 102, the secondary light emitter(s) 104 may include narrowband light sources, such as laser diodes, laser diode bars, VCSELs, or fiber lasers, or broadband light sources, such as LEDs. Other types of light sources are possible as well.

In an example embodiment, LIDAR device 100 includes only one secondary light emitter 104. The single secondary light emitter 104 may be configured to emit light that illuminates a field of view that encompasses the respective fields of view of the primary light emitter(s) 102. The light from the secondary light emitter 104 may have a lower intensity than the light from each of the primary light emitter(s) 102 due to the light being spread out over a wider field of view. In such embodiments, the secondary light emitter 104 may be described as a "flash illuminator" or "flood illuminator."

The detector(s) 106 could include any type of light detector that is arranged to intercept and detect reflections of light emitted by primary light emitter(s) 102 and secondary light emitter(s) 104 that return to the LIDAR device 100 from the environment. Example detector(s) 106 include photodiodes, avalanche photodiodes (APDs), silicon photomultipliers (SiPMs), single photon avalanche diodes (SPADs), multi-pixel photon counters (MPPCs), phototransistors, active pixel sensors (APS), charge coupled devices (CCD), cryogenic detectors, and/or any other detector that can detect light having the wavelengths emitted by the primary light emitter(s) 102 and secondary light emitter(s) 104.

In example embodiments, the detector(s) 106 are paired with the primary light emitter(s) 102 to form a plurality of transmit/receive channels. In each transmit/receive channel, the primary light emitter is configured to emit light into a respective field of view and the detector(s) that are paired with the primary light emitter is configured to receive and detect light from the same or similar field of view.

The primary emitter circuitry 108 includes circuitry that can selectively activate and deactivate individual primary light emitters in the primary light emitter(s) 102 for particular measurement periods, for example, under the control of the controller 128. To activate a selected primary light emitter for a particular measurement period, the primary emitter circuitry 108 may include a capacitor (or other energy storage device) that is charged up and then discharged such that a current flows through the selected primary light emitter. The current flowing through the selected primary light emitter causes the selected primary light emitter to emit a light pulse during the particular measurement period. To deactivate a selected primary light emitter for a particular measurement period, the primary emitter circuitry 108 could either not charge up the capacitor or could charge up the capacitor and then discharge the capacitor in such a way that little or no current flows through the selected primary light emitter (e.g., the capacitor could be discharged through a current path that does not flow through the selected primary light emitter). As a result, the selected primary light emitter does not emit a light pulse (or emits a light pulse that has a threshold low pulse energy) during the particular measurement period.

The secondary emitter circuitry 110 includes circuitry that causes one or more of the secondary light emitter(s) 104 to emit a light pulse in one or more measurement periods. In some embodiments, the secondary emitter circuitry 110 causes a secondary light emitter 104 to emit a light pulse during a specialized measurement period in which the primary light emitter(s) 102 do not emit light. Such a specialized measurement period may be used to map out the locations of retroreflectors in the environment based on reflections of the light pulse emitted by the secondary light emitter(s) 104 that are detected by the detector(s) 106. The specialized measurement period may be followed by one or more standard measurement periods. In a standard measurement period, the primary light emitter(s) 102 can be selectively activated to emit light pulses or deactivated to avoid illuminating retroreflectors while the secondary light emitter(s) 104 do not emit light.

In other embodiments, the secondary emitter circuitry 110 controls the secondary light emitter(s) 104 to emit a light pulse in each measurement period. For example, during each measurement period, the secondary emitter circuitry 110 may cause a secondary light emitter 104 to emit a light pulse a certain period of time (e.g., approximately 50 nanoseconds) after the light pulses are emitted by the primary light emitter(s) 102. Alternatively, the secondary emitter circuitry 110 may cause a secondary light emitter 104 to emit a light pulse before or at the same time the light pulses are emitted by the primary light emitter(s) 102.

The detector circuitry 112 is configured to output a respective signal based on light detected by each of the detector(s) 106. For example, the detector circuitry 112 may include for each of the detector(s) 106 a respective analog-to-digital converter (ADC) that is configured to sample the output of the detector at various times so as to output at each time a digital value that corresponds to the detected light signal (e.g., a current resulting from detected photons). The sampling rate of the ADC may be selected based on the pulse duration of the emitted light pulses so as to obtain multiple samples for each reflected pulse. For example, if the emitted light pulses have a pulse duration of 2 nanoseconds, the ADC may sample the output of a detector every 100 to 500 picoseconds. The digital values determined in this way may be used to determine the shape of a reflected light pulse detected by a detector as a function of time (e.g., including a rising edge, a peak, and a falling edge).

The primary optical element(s) 114 may include one or more lenses, mirrors, light guides, apertures, diffusers, and/or other optical elements that direct light emitted by the primary light emitter(s) 102 into an environment of the LIDAR device 100 and that direct reflected light from the environment to the detector(s) 106. In example embodiments, the primary optical element(s) 114 pair the primary light emitter(s) 102 with the detector(s) 106 to form one or more transmit/receive channels. In such embodiments, each transmit/receive channel is associated with a respective field of view, and the primary optical element(s) 114 direct light from the primary light emitter of a channel into the channel's particular field of view and direct reflected light from within the channel's particular field of view to the corresponding detector(s) of the channel.

The secondary optical element(s) 116 may include one or more lenses, mirrors, light guides, apertures, diffusers, and/or other optical elements that direct light emitted by the secondary light emitter(s) 104 into an environment of the LIDAR device 100. In example embodiments, the secondary optical element(s) 116 spread out the light emitted by a secondary light emitter 104 into a field of view that encompasses the respective fields of view of the primary light emitter(s) 102 and the detector(s) 106.

In some embodiments, the LIDAR device 100 is configured to rotate or pivot. As shown in FIG. 1, LIDAR device 100 includes movable platform 118 that can rotate or pivot relative to stationary platform 120 under the control of actuator(s) 122. The stationary platform 120 could be, for example, mounted on a vehicle. The primary light emitter(s) 102, secondary light emitter(s) 104, detector(s) 106, primary emitter circuitry 108, secondary emitter circuitry 110, detector circuitry 112, primary optical element(s) 114, and secondary optical element(s) 116 could be mounted on or coupled to the movable platform 118. The actuator(s) 122 may include one or more motors, pneumatic actuators, hydraulic pistons, and/or piezoelectric actuators, and/or any other types of actuators. The actuator(s) 122 may be operated (e.g., by controller 128) to cause the movable platform 118 to rotate or pivot about an axis of rotation. In some embodiments, the axis of rotation may be a vertical axis. For example, the LIDAR device 100 may be mounted on a vehicle, and the axis of rotation may be generally perpendicular to the road surface on which the vehicle is operating. In some embodiments, the movable platform 118 may rotate through a full 360 degrees at a rate of 3-30 Hz. Other rates of rotation are possible as well. In other embodiments, the movable platform 118 may rotate less than 360 degrees. For example, the movable platform 118 may swivel back and forth within a range of angles. In some embodiments, the movable platform 118 may continuously rotate the LIDAR device 100 during a plurality of measurement periods. In other embodiments, the movable platform 118 may not provide continuous rotation but may instead be used to adjust the orientation of the LIDAR device 100 at various times (e.g., in response to identifying certain regions of interest in the environment).

As shown in FIG. 1, the LIDAR device 100 includes a housing 124 that encloses the primary light emitter(s) 102, secondary light emitter(s) 104, detector(s) 106, primary emitter circuitry 108, secondary emitter circuitry 110, detector circuitry 112, primary optical element(s) 114, and secondary optical element(s) 116. The housing 124 may be coupled to the movable platform 118. In some embodiments, the housing 124 may be transparent to the light emitted by the primary light emitter(s) 102 and the secondary light emitter(s) 104. In other embodiments, the housing 124 may be opaque but may include an optical window 126 that is transparent to the light emitted by the primary light emitter(s) 102 and the secondary light emitter(s) 104. For example, the primary optical element(s) 114 and the secondary optical element(s) 116 may be arranged so as to direct light emitted by the primary light emitter(s) 102 and the secondary light emitter(s) 104 through the optical window 126 into the environment of the LIDAR device 100 and may be arranged so as direct to the detector(s) 106 reflected light from the environment that enters the LIDAR device 100 through the optical window 126.

In some embodiments, the primary optical element(s) 114 may define a first optical path from the primary light emitter(s) 102 to the optical window 126 and the secondary optical element(s) 116 may define a second optical path from the secondary light emitter(s) 104 to the optical window 126. The first and second optical paths could be separate. Alternatively, the first and second optical paths could be partially overlapping.

Controller 128 may include one or more processors 130 and data storage 132. The processor(s) 130 may include one or more general-purpose processors and/or one or more special-purpose processors (e.g., digital signal processors, etc.). The data storage 132 may include or take the form of one or more non-transitory computer-readable storage media that may be read or accessed by the processor(s) 130. The data storage 132 can include volatile and/or non-volatile storage components, such as electrical, optical, magnetic, organic or other memory or disc storage, which may be integrated in whole or in part with at least one of the processor(s) 130. In addition to or instead of processor(s) 130 and data storage 132, controller 128 may include other types of analog and/or digital circuitry. For example, controller 128 may include a field-programmable gate array (FPGA) or an application-specific integrated circuit (ASIC).

In some examples, data storage 132 may store program instructions that are executable by processor(s) 130 to cause the LIDAR device 100 to perform the various operations described herein. For example, controller 128 may control the primary light emitter(s) 102 through the primary emitter circuitry 108 (e.g., to activate and deactivate individual light emitters in the primary light emitter(s) 102) and may control the secondary light emitter(s) 104 through the secondary light emitter circuitry 110. Controller 128 may also receive data from the detector circuitry 112 (e.g., ADC values with corresponding timestamps) and may analyze the data to detect reflect light pulses and to identify reflected light pulses that are indicative of reflection by a retroreflectors. Controller 128 may also control the actuator(s) 122 so as to control the rotation of the LIDAR device 100. Controller 128 may perform other operations as well. Further, in connection with certain operations, controller 128 may communicate with computing devices or other components outside of LIDAR device 100. For example, in implementations in which LIDAR device 100 is coupled to an autonomous vehicle, controller 128 may transmit data to and receive instructions from a computing device that controls the autonomous operation of the vehicle.

FIG. 1 depicts LIDAR device 100 in an example configuration. It should be understood that components of LIDAR device 100 can be added or removed while still allowing for LIDAR device 100 to perform the same or similar functionality as that described above with respect to FIG. 1, or below with respect to FIGS. 2, 3A-3E, 4, 5, and/or 6. Further, to the extent that a plurality of like components are depicted and/or described with respect to FIG. 1 (e.g., primary and secondary light emitter(s) 102 and 104, primary and secondary emitter circuitry 108 and 110, and primary and secondary optical element(s) 114 and 116), fewer of these like components (e.g., a single component, such as single light emitter, a single emitter circuit, or a single optical element) could be used to achieve the same or similar functionality as that described herein.

Figure 2A:
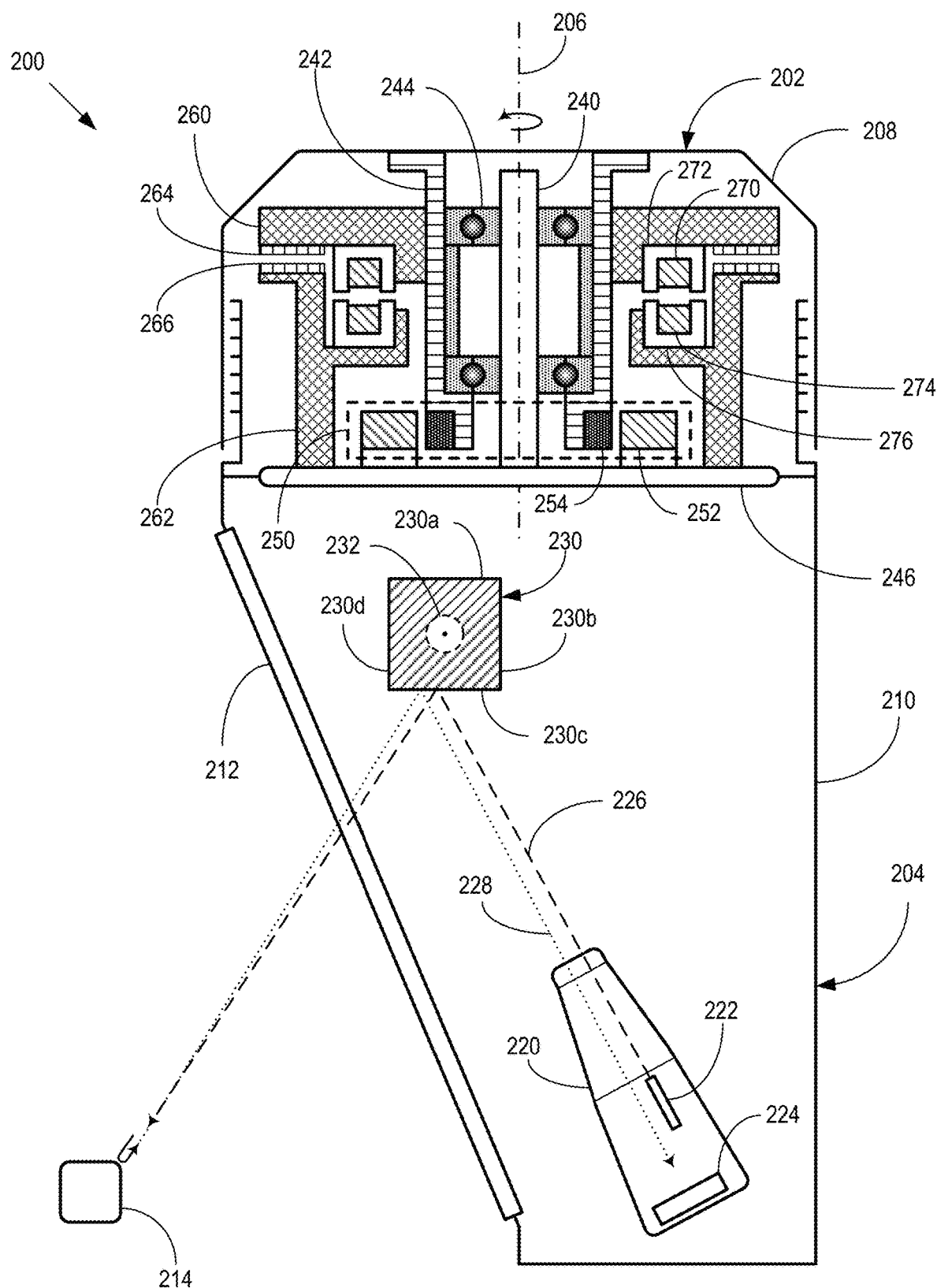
FIG. 2A illustrates a sectional view of a LIDAR device, according to an example embodiment.

FIG. 2A illustrates a sectional view of a LIDAR device, according to an example embodiment. In this example, LIDAR device 200 includes a stationary portion 202, which could be mounted to a vehicle or other base structure, and a movable portion 204. In this example, the movable portion 204 is configured to rotate about an axis of rotation 206. In example embodiments, the rate of rotation could be between 3 Hz and 60 Hz, though other rotation rates are possible as well.

The stationary portion 202 and movable portion 204 include respective housings 208 and 210. The housing 210 of the movable portion 202 includes an optical window 212. Within the housing 210, the movable portion includes various components to transmit light pulses into an environment of the LIDAR device 200, via optical window 212, and to receive returning light pulses from the environment, via optical window 212. For example, one or more light emitters (e.g., one or more laser diodes) can be configured to emit light pulses towards the environment. The returning light pulses correspond to transmitted light pulses that have been reflected by objects in the environment, exemplified in FIG. 2A by object 214.

The light pulses could have any wavelength in the ultraviolet, visible, or infrared portions of the electromagnetic spectrum. In example embodiments, the light pulses have near-infrared wavelengths (e.g., wavelengths between 800 and 1600 nanometers (nm), such as 905 nm or 1550 nm). The optical window 212 is composed of a material that is transparent to the wavelengths of the transmitted light pulses. For example, the optical window 212 could be a polymeric material (e.g., polycarbonate, acrylic, etc.), glass, quartz, or sapphire.

In this example, the movable portion 204 includes an optical cavity 220 that includes one or more light emitters 222 and one or more light detectors 224. The one or more light emitters 222 could include, for example, laser diodes, laser diode bars, light emitting diodes (LEDs) or other types of light sources. The one or more light detectors 224 may include, for example, avalanche photodiodes (APDs), single-photon avalanche diodes (SPADs), silicon photomultipliers (SiPMs), or other types of light detectors.

The one or more light emitters 222 are configured to emit light pulses that propagate along a transmit path 226. The one or more light detectors 224 are configured to detect returning light pulses that propagate along a receive path 228. A mirror 230 deflects the emitted light pulses from the transmit path 226 toward the optical window 212 for transmission into the environment. In addition, returning light pulses from objects in the environment (e.g., object 214) can enter the LIDAR device through the optical window 212 and can be deflected by the mirror 230 into the receive optical path 228.

In example embodiments, the mirror 230 includes four reflective surfaces 230a-230d that are symmetrically arranged around a mirror shaft 232. The mirror shaft 232 is driven by a mirror motor (not shown) that causes rotation of the mirror 230 about a mirror axis of rotation (e.g., the axis of the shaft 232), which may be perpendicular to the axis of rotation 206. With this rotation of mirror 230, different reflective surfaces of the reflective surfaces 230a-230d intersect the transmit and receive paths 226 and 228 at different times. FIG. 2A illustrates a point in time when reflective surface 230c intersects the transmit and receive paths 226 and 228. Although FIG. 2A illustrates an example in which the mirror 230 includes four reflective surfaces. The mirror 230 could include a greater or fewer number of reflective surfaces.

The movable portion 204 may rotate about the axis of rotation 206 at the same time that the mirror 230 rotates about the mirror axis of rotation. In the example illustrated in FIG. 2A, the rotation of the movable portion 202 involves the rotation of an inner shaft 240 relative to an outer shaft 242. The inner and outer shafts are concentrically arranged and rotationally coupled together by a bearing 244. The inner shaft 240 is connected to a base plate 246, which is connected to the housing 210 of the movable portion 240. The outer shaft 242 is connected to the housing 208 of the stationary portion 202.

A motor 250 (indicated by dashed lines) causes rotation of the inner shaft 240 relative to the outer shaft 242 and, thus, rotation of the movable portion 204 relative to the stationary portion 202. The motor 250 includes a stator 252 that is supported by the base plate 246. Current applied to the stator 252 (e.g., current flowing through a field winding in the stator 252) generates a magnetic field that interacts with magnets 254 disposed on the outer shaft 242 (rotor) to cause rotation. Because the outer shaft 242 (rotor) is part of the stationary portion 202 (e.g., the outer shaft 242 is connected to the housing 208 of the stationary portion 202) and the stator 252 is part of the movable portion 204 (e.g., the stator 252 is supported by the base plate 246, which is connected to the housing 210 of the movable portion 204). The resulting rotation is rotation of the movable portion 204 relative to the stationary portion 202.

The movable portion 204 of the LIDAR device 200 may generate data that is transmitted into the stationary portion 202 via a wireless data transformer. Such data may include, for example, data indicative of returning light pulses detected by the one or more light detectors 224 (e.g., the times when returning light pulses are detected, the magnitudes of the returning light pulses, the shapes of the returning light pulses, etc.). Such data may further include data indicative of the position of mirror 230 about the mirror rotation axis (e.g., data from an encoder in the mirror motor) and data indicative of the position of the movable portion 204 about the axis of rotation 206 (e.g., data from an encoder in motor 250) as a function of time.

Electrical components of the movable portion 204 may also be powered by electrical power that is transmitted from the stationary portion 202 via a wireless power transformer. Such electrical components may include, for example, motor 250, the mirror motor, the one or more light emitters 222, and the one or more light detectors 224. Such electrical components may also include other electronics not shown in FIG. 2A. For example, the movable portion 204 may include an application processor and a G.hn communication interface (e.g., as shown in FIG. 2).

To implement a wireless data transformer and a wireless power transformer in LIDAR device 200, the stationary portion 202 includes a first platform 260 mounted on the outer shaft 242, and the movable portion 204 includes a second platform 262 mounted on the base plate 246. A first PCB 264 is disposed on the first platform 260, and a second PCB 266 is disposed on the second platform 262. The PCBs 264 and 266 are spaced apart by a gap and include respective conductive traces (e.g., respective conductive loops) that are inductively coupled together across the gap so as to form a wireless data transformer (e.g., as described above for FIG. 4). A primary winding 270 and ferrite core 272 are disposed in the first platform 260, and a secondary winding 274 and ferrite core 276 are disposed in the second platform 262. The primary and secondary windings 270 and 274 are spaced apart by a gap and are inductively coupled together across the gap so as to form a wireless power transformer (e.g., as described below with respect to FIGS. 4 and 5A).

Figure 5A:
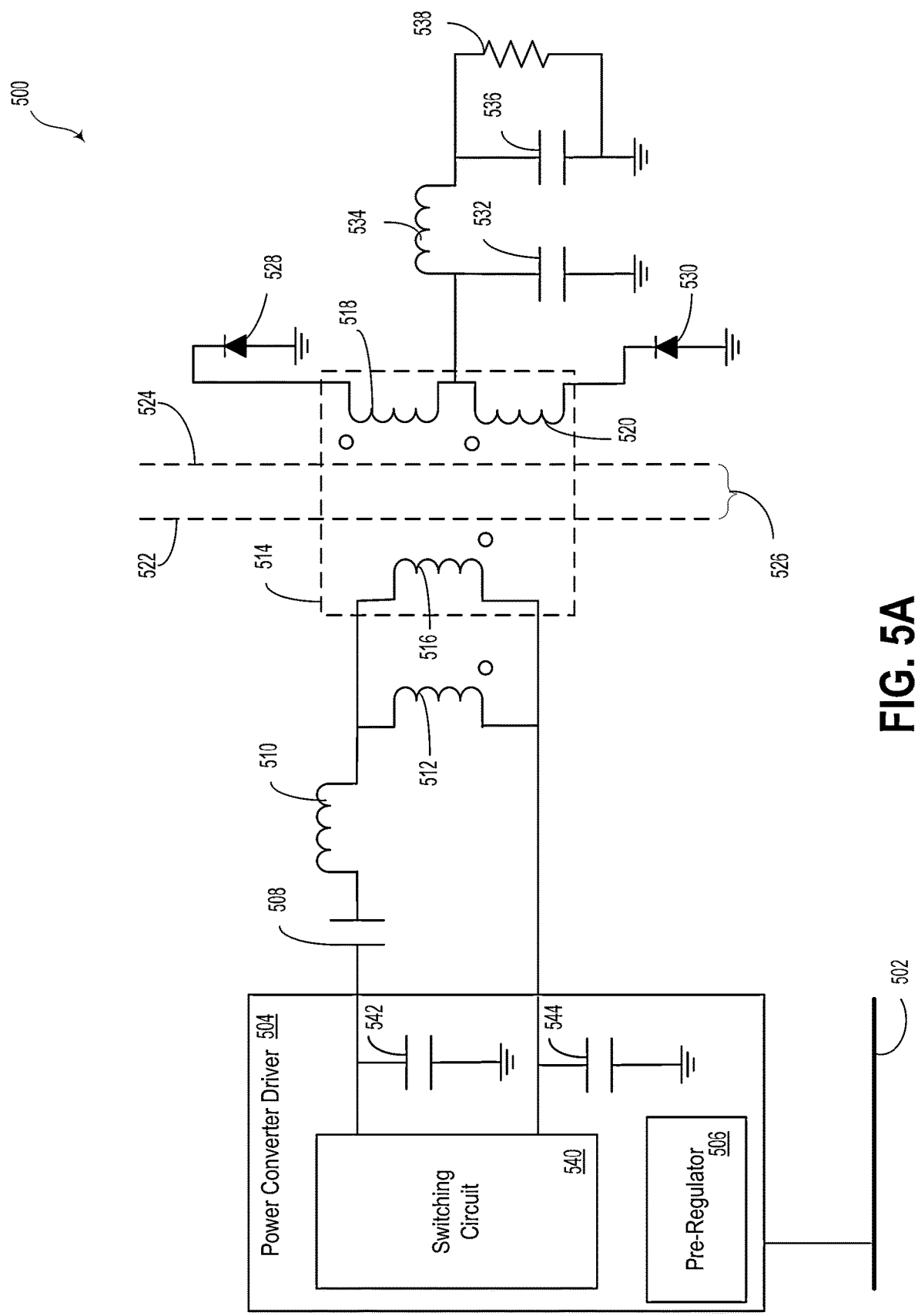
FIG. 5A is a simplified block diagram of another system, according to an example embodiment.

LIDAR device 200 can also include a load associated with second platform 262. The load can be representative of power-consuming elements in LIDAR device 200. For example, the load may include one or more light emitters, one or more light detectors, a computing device (e.g., controller 128 and associated processor(s) 130 and data storage 132), as well as electrical components and/or circuitry associated with the emitters, light detectors, and computing device. As shown in FIG. 5A, the load can conceptually be understood as a resistor within a circuitry context of an LLC resonant power converter.

Figure 2C:
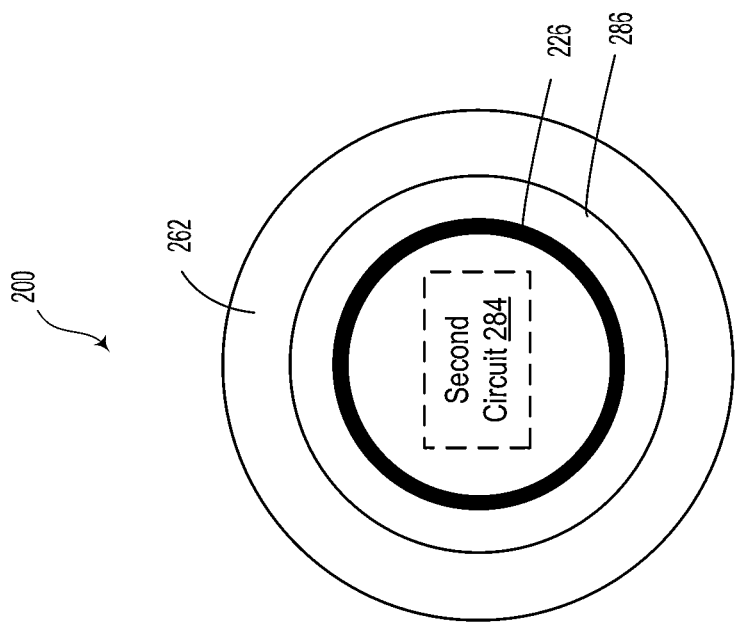
FIG. 2C illustrates a sectional view of a LIDAR device, according to an example embodiment.
Figure 2B:
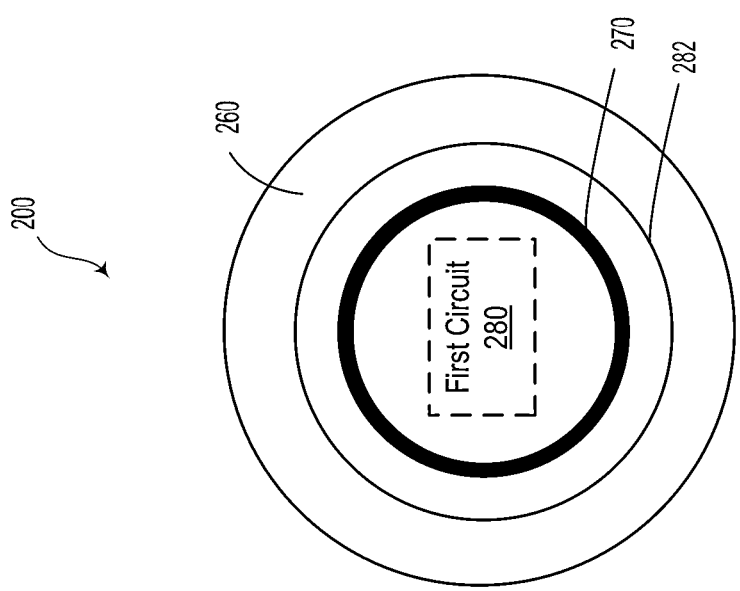
FIG. 2B illustrates a sectional view of a LIDAR device, according to an example embodiment.

FIG. 2B illustrates a sectional view of a LIDAR device, according to an example embodiment. In particular, FIG. 2B shows a top view of first platform 260. first platform 260 includes a first circuit 280, a primary winding 270 of a transformer, and a first wireless communication link 282. As shown in FIG. 2B, primary winding 270 is concentrically oriented with first wireless communication link 282. The transformer can be a toroidal transformer, and thus primary winding 270 can include a ferrite core wrapped in one or more toroidal inductors. First wireless communication link 282 can include a conductive trace (e.g., the conductive trace can be a conductive loop that forms a loop antenna). First circuit 280 is configured to control a wireless power signal provided via primary winding 270. Accordingly, first platform 260 can be configured to provide both a power signal and a communication signal for the LIDAR device 200.

FIG. 2C illustrates a sectional view of a LIDAR device, according to an example embodiment. In particular, FIG. 2C shows a top view of second platform 262. An outline of housing 204 is provided for illustrative purposes. The LIDAR device 200 can be mounted on first platform 260 via second platform 262. second platform 262 includes a second 284, a secondary winding 274, and a second wireless communication link 286. Second wireless communication link 286 a conductive trace (e.g., the conductive trace can be a conductive loop that forms a loop antenna). The transformer can be a toroidal transformer, and thus secondary winding 274 can include a ferrite core wrapped in one or more toroidal inductors. Second wireless communication link 286 can include a loop antenna. Second 284 can include one or more filters and/or post-regulators configured to prevent excess power being delivered to power-consuming aspects of LIDAR device 200. As shown in FIG. 2C, secondary winding is concentrically oriented with second wireless communication link 282. Within examples, primary winding 270 and secondary winding 274 are aligned relative to a common axis (e.g., rotational axis 206 shown in FIG. 2A), and first wireless communication link 282 and second wireless communication link 286 can similarly be aligned.

Thus, as shown in FIGS. 2A, 2B, and 2C, a LIDAR device 200 can include a rotational mechanism (also referred to herein as a rotary link) configured to simultaneously provide a mechanical coupling between first platform 260 and second platform 262, but also to provide a wireless power signal and a wireless communication signal between the two platforms. In this manner, power can be provided to LIDAR device 200 via the same component used for facilitating rotary movement in the LIDAR device without the potential wear associated with using a physical power connection within a rotational mechanism.

FIGS. 3A-3E illustrate a vehicle 300, according to an example embodiment. The vehicle 300 could be a semi- or fully-autonomous vehicle. While FIGS. 3A-3E illustrates vehicle 300 as being an automobile (e.g., a minivan), it will be understood that vehicle 300 could include another type of autonomous vehicle, robot, or drone that can navigate within its environment using sensors and other information about its environment.

The vehicle 300 may include one or more sensor systems 302, 304, 306, 308, and 310. In example embodiments, sensor systems 302, 304, 306, 308, and 310 each include a respective LIDAR device. For example, any of sensor systems 302, 304, 306, 308, and 310 can include a LIDAR device that is configured the same or similarly to LIDAR device 200. In addition, one or more of sensor systems 302, 304, 306, 308, and 310 could include radar devices, cameras, or other sensors.

The LIDAR devices of sensor systems 302, 304, 306, 308, and 310 may be configured to rotate about an axis (e.g., the z-axis shown in FIGS. 3A-3E) so as to illuminate at least a portion of an environment around the vehicle 300 with light pulses and detect reflected light pulses. Based on the detection of reflected light pulses, information about the environment may be determined. The information determined from the reflected light pulses may be indicative of distances and directions to one or more objects in the environment around the vehicle 300. For example, the information may be used to generate point cloud information that relates to physical objects in the environment of the vehicle 300. The information could also be used to determine the reflectivities of objects in the environment, the material composition of objects in the environment, or other information regarding the environment of the vehicle 300.

The information obtained from one or more of sensor systems 302, 304, 306, 308, and 310 could be used to control the vehicle 300, such as when the vehicle 300 is operating in an autonomous or semi-autonomous mode. For example, the information could be used to determine a route (or adjust an existing route), speed, acceleration, vehicle orientation, braking maneuver, or other driving behavior or operation of the vehicle 300.

Within examples, a LIDAR device associated with a given sensor system is coupled to a structure. For example, FIGS. 3A-3E show sensor systems having LIDAR devices that are each coupled to a portion of vehicle 300. For example, a LIDAR device associated with sensor system 304 is connected to a front portion 312 of vehicle 300, and includes a stationary platform (e.g., the first platform 260 described above) and a movable platform (e.g., the second platform 262 described above). In other examples, A LIDAR device can be coupled to other portions of vehicle 300, such as a back portion, side portion, top portion, or any surface portion of vehicle 300. Vehicle 300 is configured to move. Accordingly, the stationary platform can be understood as being stationary relative to a system, such as vehicle 300, and not necessarily with respect to an environment surrounding the system.

Figure 3A:
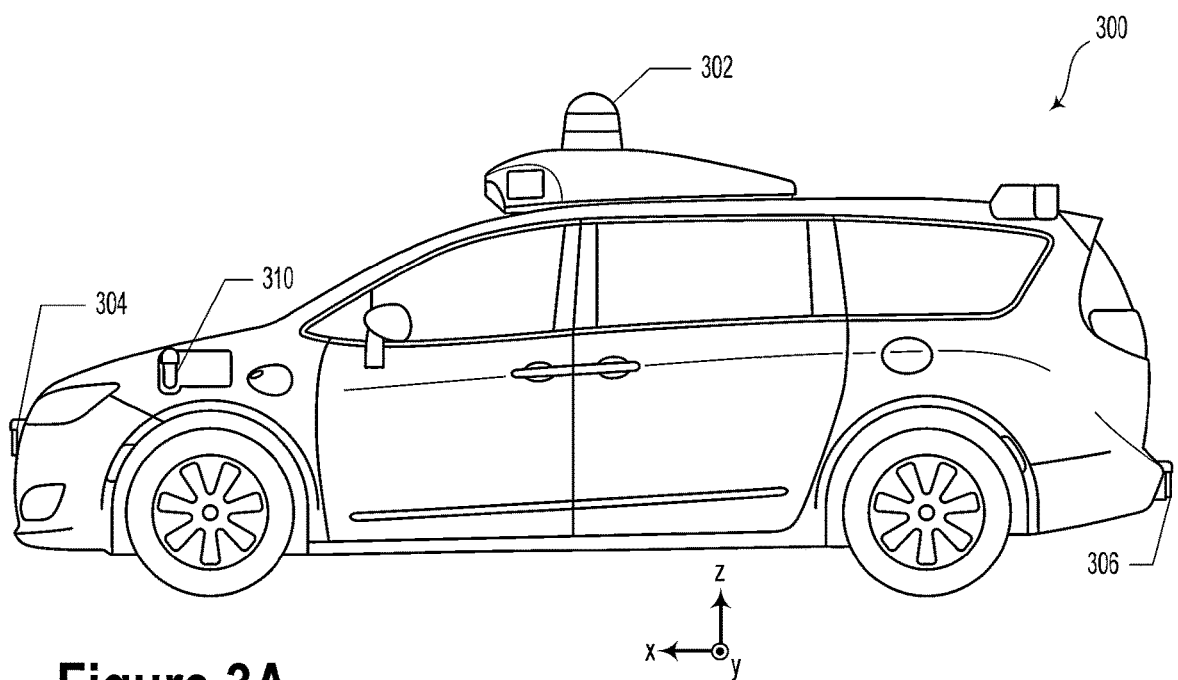
FIGS. 3A-3E illustrate a vehicle, according to an example embodiment.
Figure 3B:
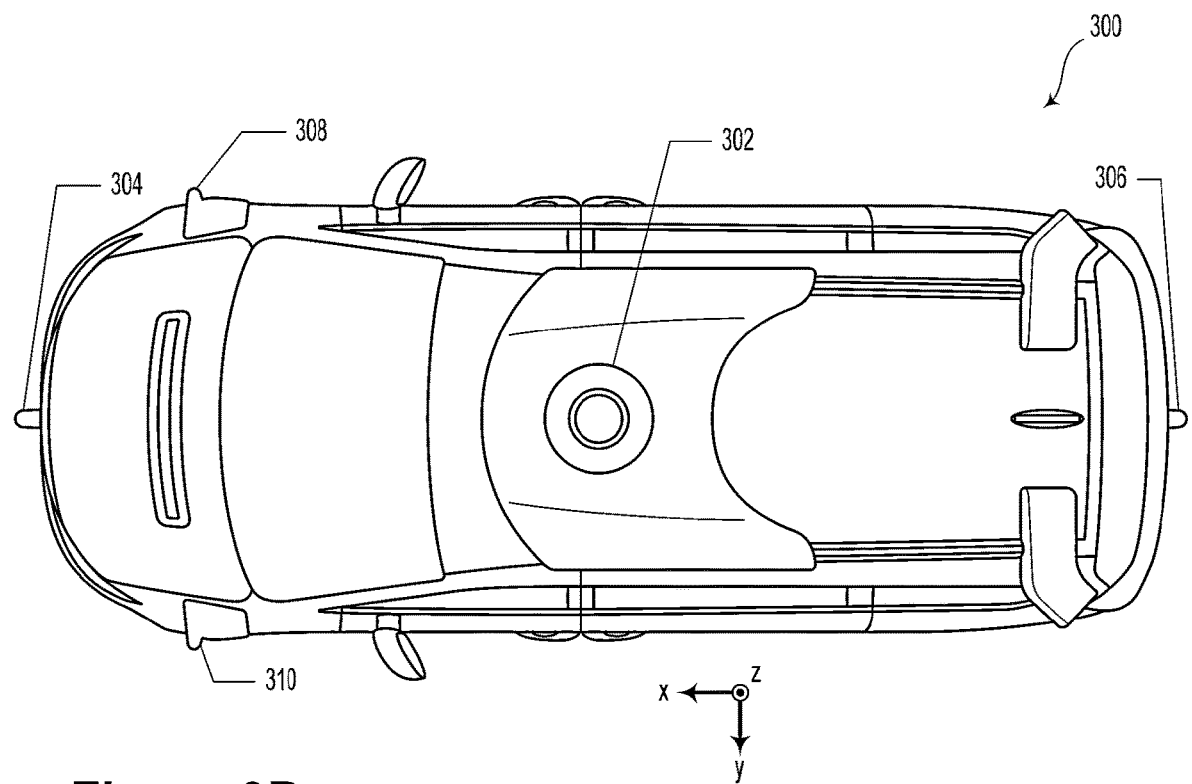
Figure 3C:
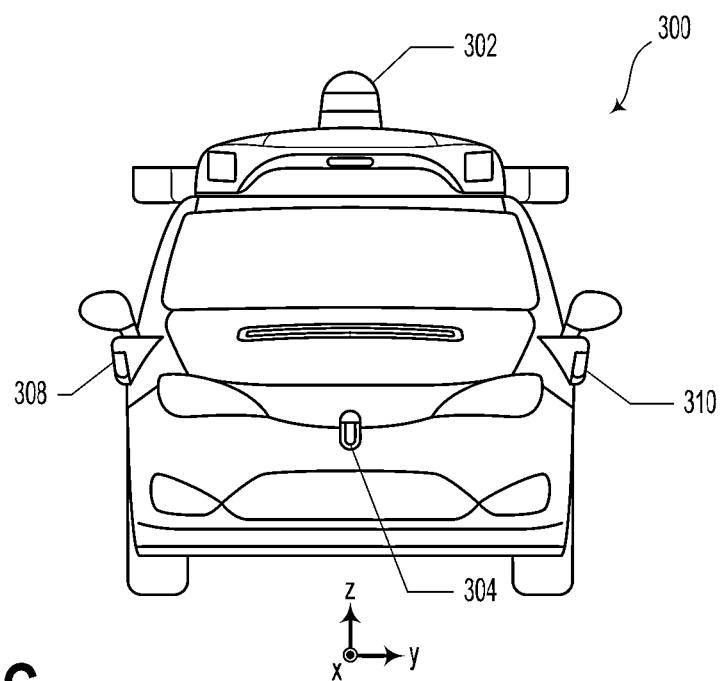
Figure 3D:
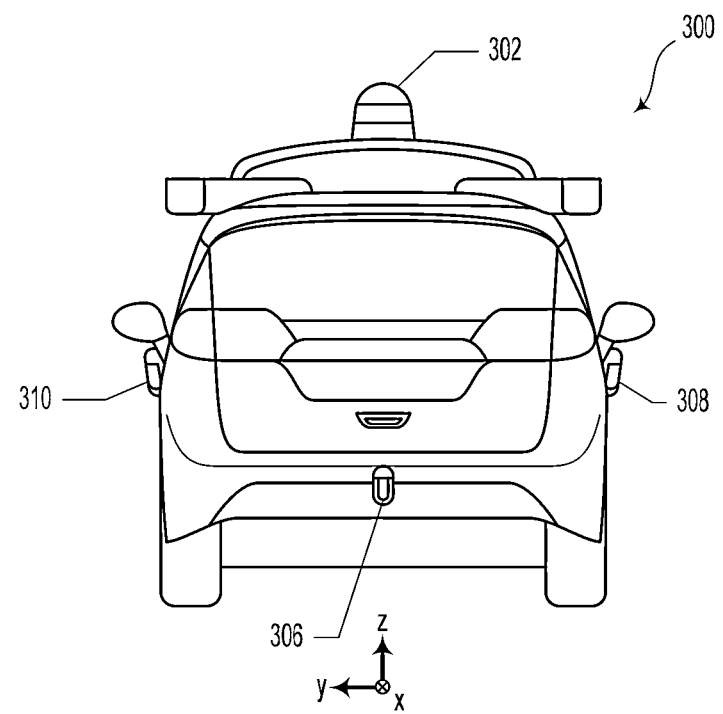
Figure 3E:
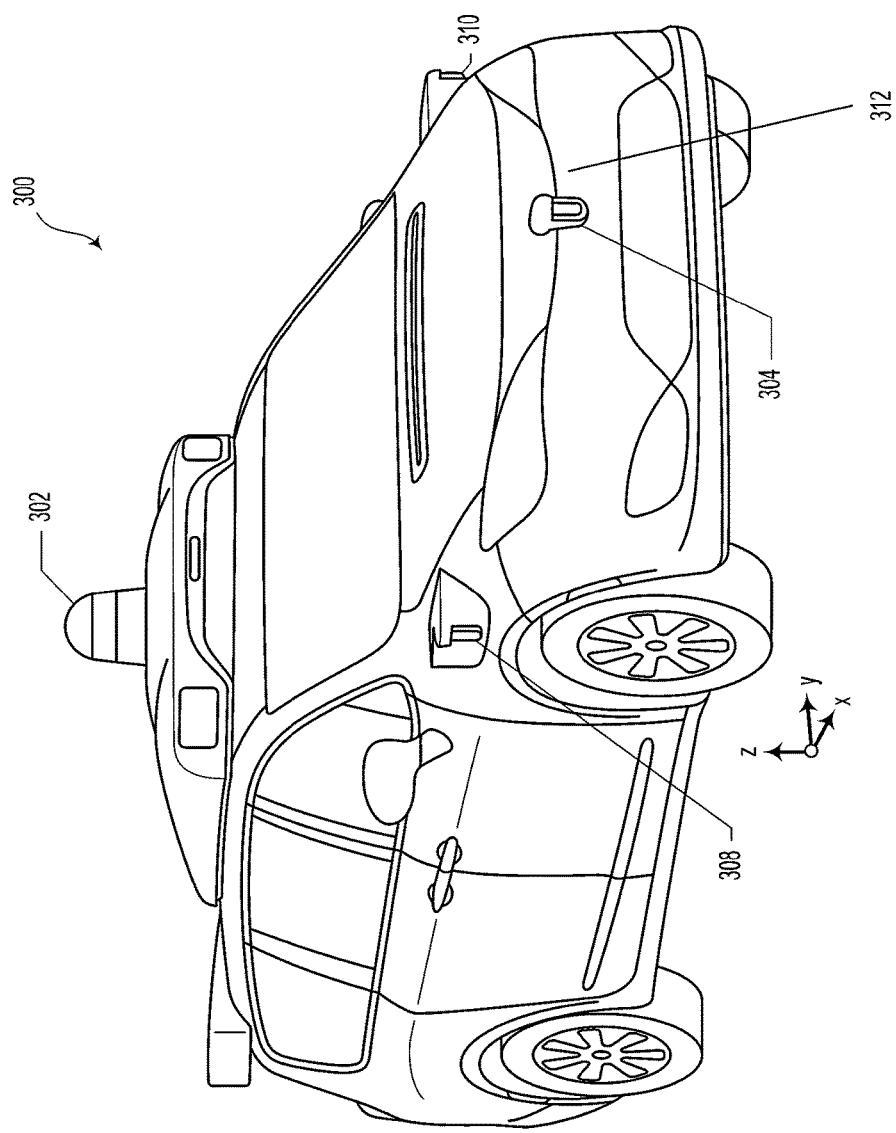

As shown in FIG. 3E, the movable platform can be disposed within a housing of the LIDAR device or exposed. Accordingly a rotational mechanism that connects the movable platform to the stationary platform can be disposed between a portion (e.g., front portion 312) of a vehicle and a housing of the LIDAR device.

Within examples, the stationary platform receives an initial power signal from the vehicle 300 (e.g., via a common power bus of vehicle 300), and responsively transmits a wireless power signal to the movable platform, thereby providing power to the LIDAR device.

Figure 4:
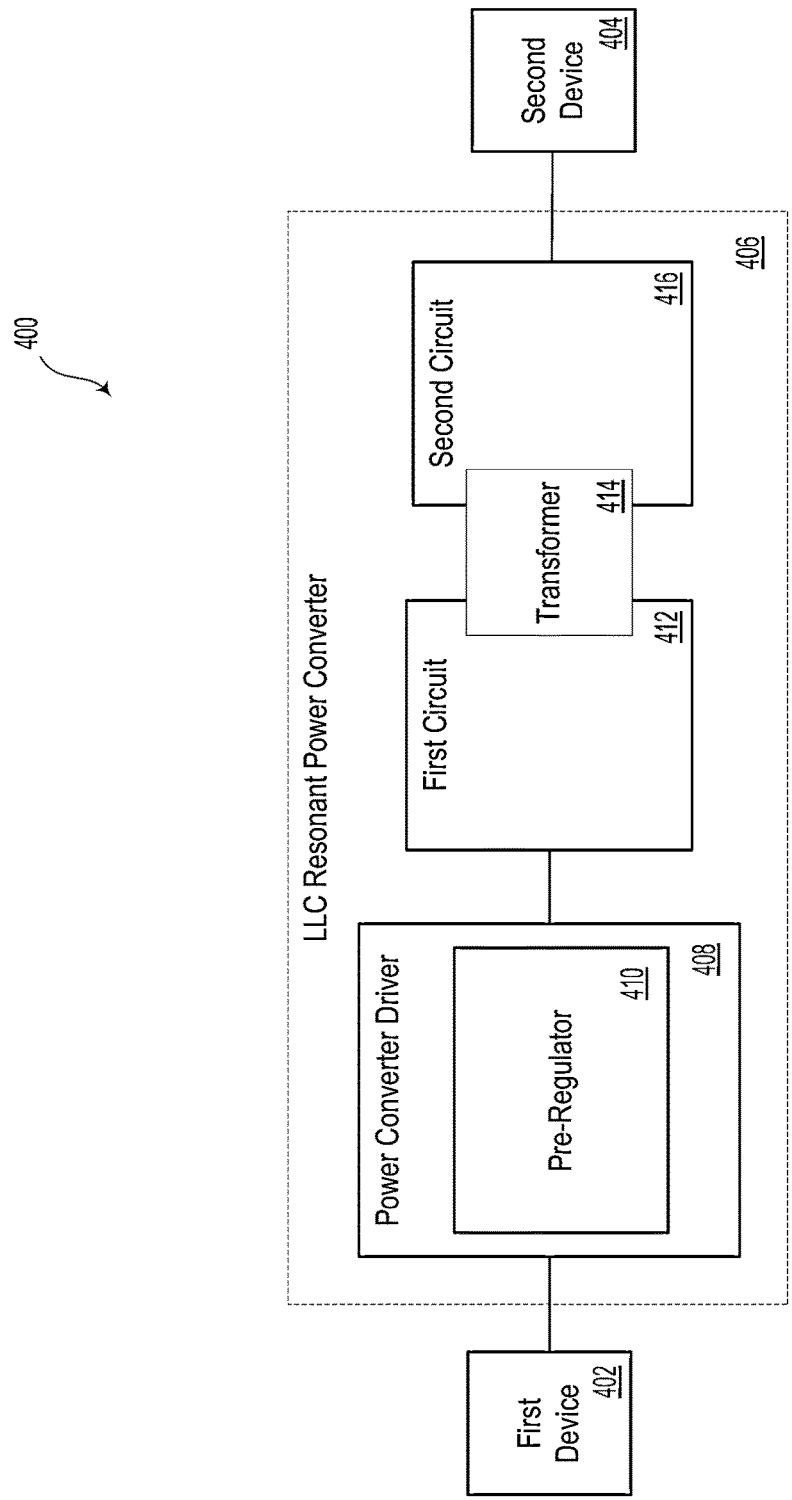
FIG. 4 is a simplified block diagram of a system, according to an example embodiment.

FIG. 4 is a simplified block diagram of a system, according to an example embodiment. In particular, FIG. 4 shows a system 400, which includes a first device 402, a second device 402, and an LLC resonant power converter 406. Though LLC resonant power converter 406 is depicted separately from first device 402 and second device 404, it should be understood that aspects of LLC resonant power converter 406 can be integrated into one or more of first device 402 and second device 404. For illustrative purposes, first device 402 can be understood as vehicle 302 or a component thereof, and second device 404 can be understood as LIDAR device 304 or a component thereof. However, first device 402 and second device 404 can correspond to other devices.

The LLC resonant power converter 406 includes a power converter driver 408, which in turn includes a pre-regulator 408, a first circuit 412, a transformer 414, and a second circuit 416. First circuit can receive an initial power signal from first device 402 via power converter driver 408 and responsively send a wireless power signal to second circuit 416 via transformer 414. Second circuit 416 can thereby power second device 404.

Though only pre-regulator 410 is depicted within power converter driver 408, power converter driver 408 may include one or more additional circuits configured to pre-process the initial power signal. For example, power converter driver 408 can include an electromagnetic interference (EMI) filter configured to reduce interference from electric components in first device 402 introduced in the initial power signal, an input protection circuit configured to place limits on an amount of power output by first circuit 412, a drive logic controller configured to set particular current and/or voltage outputs of first circuit 412 depending on control signals received from first device 402 or second device 404, and a transformer driver configured to control output characteristics (e.g., a winding ratio) of transformer 414.

Pre-regulator 408 may alter an input voltage associated with the initial power signal to comport with a desired output voltage of first circuit 412, and can convert a DC power signal to an AC power signal, thereby setting an operating point of the LLC resonant power converter 406.

Within examples, LLC resonant power converter 406 can maintain an operating point in order to control a gain characteristic (e.g., a ratio of an output voltage at second circuit 416 to an input voltage of first circuit 412) of first circuit 412, transformer 414, and second circuit 416. For example, the gain characteristic can be controlled to remain at a unity gain. Controlling the gain characteristic can include maintaining an input frequency for the first circuit 412 to remain above a threshold frequency. The threshold frequency may correspond to one or more known power transfer characteristics of the first circuit 412, transforming 414, and second circuit 416. In particular, the threshold frequency can correspond to an operating point at which unity gain is maintained (or nearly maintained) regardless of changes to load associated with second device 404 or a gap between first circuit 412 and second circuit 416. Controlling the gain characteristic in this manner may include setting the AC frequency at or above a resonant frequency of the LLC resonant power converter 406.

A number of factors can impact a gain characteristic of the LLC resonant power converter 406. For example, the operating point of the LLC resonant power converter 406, a load associated with second device 404, a gap between a primary winding of transformer 414 and a secondary winding of transformer 414, a winding ratio of transformer 414, can each individually influence the gain characteristic. Certain factors are associated with variable aspects of system 400 that are not controllable by power converter driver 408.

For example, a load associated with second device 404 may correspond to operating modes of a LIDAR device or change dynamically based on which light emitters and detectors are selected at a given time. Further, a gap between a primary winding of transformer 414 and a secondary winding of transformer 414 can change depending on forces experienced by a first platform associated with the primary winding (e.g., stationary platform 308) and a second platform (e.g., movable platform 310) associated with the secondary winding. Accordingly, an operating point can be controlled at a point that produces a stable gain regardless of the load or gap. For example, the operating point can be controlled by the power converter driver 408 to maintain the operating point at or above the resonance frequency of LLC resonant power converter 406. As an example, the operating point can be controlled at a point between 70 kHz and 80 kHz.

Though not depicted in FIG. 4, LLC resonant power converter 406 can further include a post-regulator associated with second circuit 416. For example, a post-regulator may prevent a power level above a certain point from reaching a load of second device 404. For example, this may involve reducing a voltage level from a level received by second circuit 416 to a threshold voltage rating of second device 404, or to a voltage associated with power demand of one or more components of second device 404. Other post-regulation is possible.

Though an LLC resonant power converter is described herein, it should be understood that other resonant power converters are possible, such as an LCC resonant converter, series resonant converter, LCLC resonant converter, or a parallel resonant power converter.

FIG. 5A is a simplified block diagram of another system, according to an example embodiment. In particular, FIG. 5A shows a system 500 that includes particular circuitry associated with LLC resonant power converter 406. System 500 includes a common power bus 502. The common power bus can be associated with a first device (e.g., one or more devices associated with a vehicle), and can correspond to a common voltage for one or more components of the first device. The common voltage level may not be suitable for powering a second device. Accordingly, a pre-regulator 506 (which may correspond to pre-regulator 410) of a power converter driver 504 can alter a voltage level from the common voltage to an input voltage and/or change a DC voltage into an AC input voltage.

Power converter driver 504 further includes a switching circuit 540, which is configured to generate a square wave. Power converter driver 504 capacitors 542 an 544, which serve to shape pulses of the square wave. This shaped input signal is provided to two terminals of an LLC circuit in order to wirelessly transmit power. Further details regarding the input signal are provided below with respect to FIG. 5B.

System 500 further includes a first circuit, which includes a capacitor 508, an inductor 510, and an inductor 512. Thus, as shown in FIG. 5A, the first circuit may include an LLC circuit tuned to a resonant frequency defined by a capacitance of capacitor 508, an inductance of inductor 510, and an inductance of inductor 512. An operating point of system 500 may be controlled to remain at or above the resonant frequency of the LLC circuit.

System 500 further includes a transformer 514 having a primary winding 516 and a secondary winding that includes winding 518 and winding 520. The transformer 514 can be, for example, a toroidal transformer, or another type of transformer. The primary winding 516 and secondary winding 518/520 can be separated by a gap determined by a first platform 522 and a second platform 524. A second circuit can include one or more filters. For example, as shown in FIG. 5A, a second circuit includes an uncontrolled rectifier that includes a diode 528 and a diode 530, a CLC filter including a capacitor 532, an inductor 534, and a capacitor 536. The CLC filter may exclude a range of frequencies. For example, the CLC filter can act as a low pass filter configured to filter out frequencies below an expected operating point of system 500.

As shown in FIG. 5A, the power converter driver 504, first circuit, and primary winding 516 can be embedded in a first platform 522. Further, secondary winding 518/520, and a second circuit can be embedded in a second platform 524. First platform 522 and second platform 524 can be mechanically connected by a rotational component that maintains the gap between the primary winding 516 and secondary winding 518/520, while simultaneously mounting a second device onto a first device.

System 500 can further include a load 538. The load 538 is depicted as a resistor, which represents a power consumption capacity of a second device (e.g., a LIDAR device). The load 538 may change in accordance with the power intake of the second device. Collectively, the power converter driver 504, a first circuit, and a second circuit wirelessly connected to the first circuit via transformer 514 are configured to wirelessly transmit power from a first device (e.g., one or more components of a vehicle) to a second device (e.g., a LIDAR device).

Figure 5B:
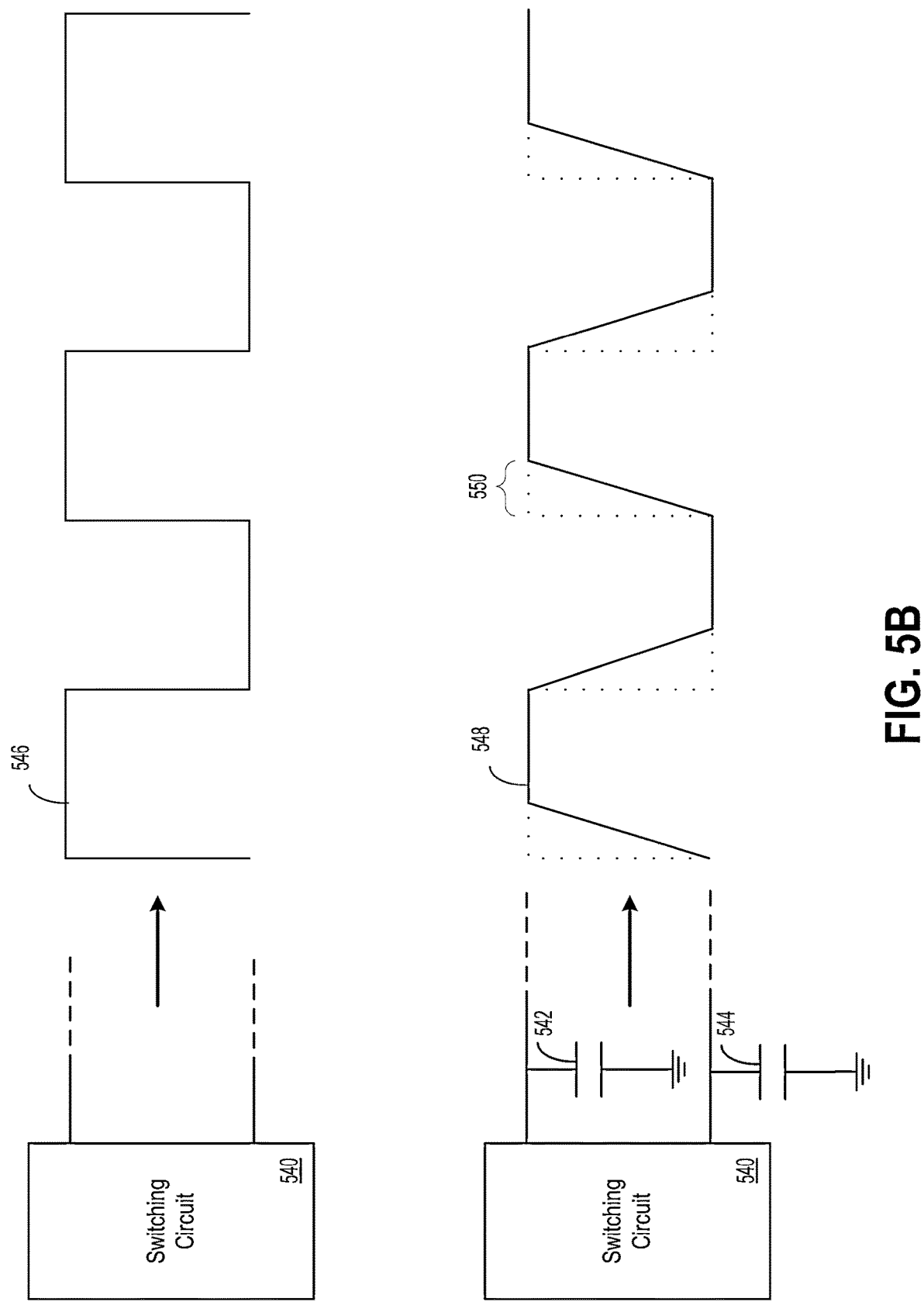
FIG. 5B illustrates an input signal for a system, according to an example embodiment.

FIG. 5B illustrates an input signal for a system, according to an example embodiment. In particular, FIG. 5B shows an initial input signal 546 and a shaped input signal 548. Switching circuit 540 can include one or more switching devices configured to drive the input signal to a high voltage and a low voltage. When coupled to two terminals of a circuit, the square wave can cause two discrete levels of voltage disparity between the two terminals. This can be an effective input signal to an LLC circuit for purposes of wireless power transfer. However, due to the near-instant switching associated with a square wave, a square wave may have a relatively large bandwidth, and harmonic frequencies may cause interference with nearby circuitry. In the present example, this may include a wireless communication link disposed within the same enclosure as the LLC circuit (e.g., first wireless communication link 282 shown in FIG. 2B). Accordingly, the input signal for the LLC circuit can be shaped to effectively reduce a bandwidth of the input signal and correspondingly reduce interference.

As shown in FIG. 5B, capacitors 542 and 544 are used for pulse shaping in system 500. By introducing capacitors 542 and 544, switching between voltage levels occurs more slowly. In particular, a delay 550 is introduced in both rising and falling edges of the shaped input signal 548. Other pulse shaping elements could be used.

Accordingly, within examples a wireless power transfer system can be placed in relative proximity to a wireless communication link. In order to reduce EMI between the wireless power transfer system and the wireless communication link. The input signal can be shaped in accordance with an operating frequency or bandwidth of the wireless communication link. In this manner, the wireless power transfer system and the wireless communication link can be placed within the same rotational mechanism while also operating effectively.

III. EXAMPLE METHODS

Described herein are example methods and processes that could be implemented in LIDAR devices 100 and 200, or systems 300, 400, and 500. However, the described methods and processes described could be implemented in other systems or devices, or in LIDAR devices that are configured differently than LIDAR devices 100 and 200.

Figure 6:
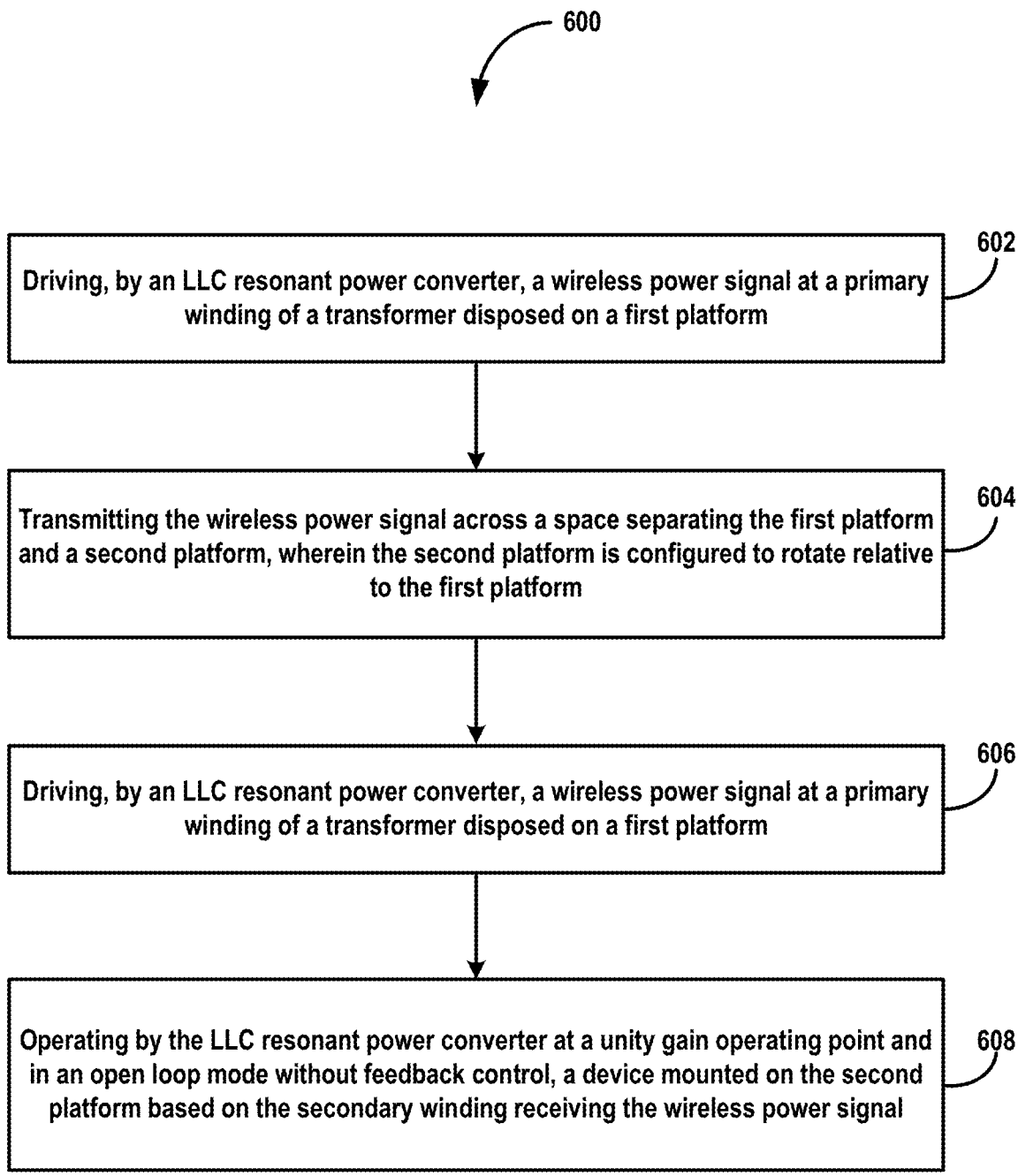
FIG. 6 is a flowchart of a method, according to an example embodiment.

FIG. 6 is a flowchart of a method 600, according to an example embodiment. Method 600 presents an embodiment of a method that could be used with any LIDAR device 100 and/or LIDAR device 200, for example, or with other systems or devices. Method 600 may include one or more operations, functions, or actions as illustrated by one or more of blocks 602-608.

In addition, for method 600 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for method 600 and other processes and methods disclosed herein, each block in FIG. 6 may represent circuitry that is wired to perform the specific logical functions in the process.

At block 602, method 600 includes driving, by an LLC resonant power converter, a wireless power signal at a primary winding of a transformer disposed on a first platform. In other examples, driving the wireless power signal can be performed by an LCC resonant converter, series resonant converter, LCLC resonant converter, a parallel resonant power converter, or another type of wireless power converter. Within examples, the first platform may correspond to first platform 260 depicted in FIGS. 2A-2C. Within examples, the primary winding can correspond to primary winding 516 depicted in FIG. 5A. The wireless power signal may correspond to an AC signal provided at a given frequency.

At block 604, method 600 includes transmitting the wireless power signal across a gap separating the first platform and a second platform. The second platform can be configured to rotate relative to the first platform. For example, the second platform can correspond to second platform 262 depicted in FIGS. 2A-2C. Transmitting the power signal can include transmitting power using the transformer.

At block 606, method 600 includes receiving the wireless power signal at a secondary winding of the transformer. The secondary winding can be disposed on the second platform. Within examples, the secondary winding can correspond to secondary winding 518/520 depicted in FIG. 5A.

At block 608, method 600 includes operating by the LLC resonant power converter at a unity gain operating point and in an open loop mode without feedback control, a device mounted on the second platform based on the secondary winding receiving the wireless power signal. For example powering the device in an open loop mode without feedback control may involve powering the device without taking an output power signal at the second platform into account. As an example, powering the device in this manner may correspond to controlling an operating point of LLC resonant power converter. Within examples, the device can be a light detection and ranging (LIDAR) device.

Within examples, the device can be a second device of two or more devices. In these examples, method 600 further includes receiving, by the LLC resonant power converter from a first device upon which the second device is mounted, an initial power signal. For example, the initial power signal may be received from a common power bus of the first device. Within these examples, powering the second device can be performed responsive to receiving the initial power signal. Within these examples, the first device can correspond to a vehicle, and the first platform can be coupled to a portion of the vehicle. For example, the first device can correspond to vehicle 302 and the second device can correspond to LIDAR device 304 as depicted in FIG. 3.

Within related examples, receiving the initial power signal comprises receiving, by the LLC resonant circuit from the first device via a common power bus of the first device, a common voltage. In these examples, method 600 can include prior to powering the second device, altering, by a pre-regulator configured to alter the common voltage. For example this may involve increasing or reducing the common voltage (e.g., using a buck, boost, or buck-boost converter) and/or changing a DC voltage signal to an AC voltage signal (e.g., using a DC to AC inverter).

Within examples, method 600 further includes operating the LLC resonant power converter at a fixed frequency. For example, this may involve setting an operating point of the LLC resonant power converter to a frequency at or above a resonant frequency of the LLC resonant power converter. This may involve setting a frequency of the LLC resonant power converter based on one or more known characteristics of the LLC resonant power converter or the device. For example, one or more of an average gap between the primary winding and secondary winding, a known resonant frequency of the LLC resonant power converter, and/or a maximum load associated with the device, can be used to determine a stable operating point for the LLC resonant power converter. In related examples in which the LLC resonant power converter has a first circuit associated with the primary winding and a second circuit associated with the secondary winding (e.g., first circuit 412 and second circuit 416 depicted in FIG. 4). Within these examples, the first circuit corresponds to a resonant frequency, and the fixed frequency can be at or above the resonant frequency. For example the resonant frequency can be between 35 kHz and 36 kHz and the fixed frequency can be about 65 kHz.

Within examples, method 600 further includes post-regulating the wireless power signal received by the secondary winding. Post-regulating the wireless power signal can be performed in accordance with a maximum power rating of the device.

Within examples, method 600 further includes receiving an indicating of an altered load associated with the device (e.g., an indication of an altered operating mode of the device). In these examples, method 600 further includes altering an operating point of the LLC resonant power converter based on the received indication. Changing the operating point can occur in different contexts as well.

Within examples, method 600 further includes determining an operating point of the LLC resonant power converter. Determining the operating point can base based on one or more of a maximum load characteristic of the device, a resonant frequency of the LLC resonant power converter, and a gap between the primary winding the secondary winding. Within related examples, method 600 can include determining the operating point based on a determined change in the gap or the maximum load.

Within examples, method 600 further includes shaping an input signal to reduce harmonic power outputs of the LLC resonant power converter. For example, shaping the input signal can include connecting one or more signal shaping elements (e.g., capacitors) to terminals of the LLC resonant power converter. Within these examples, transmitting the wireless power signal includes transmitting the wireless power signal in accordance with the shaped input signal. In this manner, harmonic frequencies initially present in the input signal (e.g., a square wave) can be reduced and thereby reduce interference with a communication signal transmitted across the gap. This can be performed in accordance with FIGS. 5A, 5B, and the corresponding description thereof.

Though examples herein are described with respect to an LLC resonant power converter, other resonant power converters can be used, such as an LCC resonant converter, series resonant converter, LCLC resonant converter, or a parallel resonant power converter. Related functionality, such setting a relevant operating point for the power converter can be performed in accordance with a corresponding topology.

Further, though method 600 is described in relation to particular examples, it should be understood that any functionality described above with respect to FIGS. 1-5 can be implemented as part of method 600.

IV. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed is:

1. A method for operating a light detection and ranging (LIDAR) device, the method comprising:
   driving, by an LLC resonant power converter, a wireless power signal at a primary winding of a transformer disposed on a first platform;
   transmitting the wireless power signal across a gap separating the first platform and a second platform, wherein the second platform is configured to rotate relative to the first platform;
   receiving the wireless power signal at a secondary winding of the transformer, wherein the secondary winding is disposed on the second platform; and
   operating, by the LLC resonant power converter at a unity gain operating point and in an open loop mode without feedback control, a device mounted on the second platform based on the secondary winding receiving the wireless power signal.

2. The method of claim 1, wherein the device is a second device, the method further comprising:
   receiving, by the LLC resonant power converter from a first device upon which the second device is mounted, an initial power signal; and
   powering the second device responsive to receiving the initial power signal.

3. The method of claim 2, wherein the first device corresponds to a vehicle, and wherein the first platform is coupled to a portion of the vehicle.

4. The method of claim 2, wherein receiving the initial power signal comprises receiving, by the LLC resonant circuit from the first device via a common power bus of the first device, a common voltage, the method further comprising:
   prior to powering the second device, altering, by a pre-regulator configured to alter the common voltage.

5. The method of claim 1, wherein operating the device at the unity gain operating point comprises operating the LLC resonant power converter at a fixed frequency.

6. The method of claim 5, wherein the LLC resonant power converter has a first circuit associated with the primary winding and a second circuit associated with the secondary winding, wherein the first circuit corresponds to a resonant frequency, and wherein the fixed frequency is at or above the resonant frequency.

7. The method of claim 1, further comprising:
   shaping an input signal to reduce harmonic power outputs of the LLC resonant power converter;
   wherein transmitting the wireless power signal comprises transmitting the wireless power signal in accordance with the shaped input signal.

8. A system, comprising:
   a first platform;
   a second platform spaced apart from the first platform by a gap, wherein the second platform is configured to rotate relative to the first platform;
   a device mounted to the second platform; and
   an LLC resonant power converter configured to operate the device at a unity gain operating point and in an open loop mode without feedback control, wherein the LLC resonant power converter comprises a transformer that has a primary winding and a secondary winding, wherein the primary winding is disposed on the first platform, wherein the secondary winding is disposed on the second platform, and wherein the primary winding is configured to transmit a wireless power signal to the secondary winding across the gap separating the first platform and a second platform.

9. The system of claim 8, further comprising an input shaping element configured to shape an input signal, wherein transmitting the wireless power signal comprises transmitting the wireless power signal in accordance with the shaped input signal.

10. The system of claim 8, wherein operating the LLC resonant power converter at the unity gain operating point comprises operating the LLC resonant power converter at a fixed frequency.

11. The system of claim 10, wherein the LLC resonant power converter has a first circuit associated with the primary winding and a second circuit associated with the secondary winding, wherein the first circuit corresponds to a resonant frequency, and wherein the fixed frequency is at or above the resonant frequency.

12. The system of claim 11, wherein the resonant frequency is between 35 kHz and 36 kHz.

13. The system of claim 8, further comprising a wireless communication link oriented concentrically with the primary winding, wherein the communication link is configured to transmit communications within a range of frequencies and wherein the fixed frequency falls outside the range of frequencies.

14. The system of claim 8, wherein the primary winding is toroidal and the secondary winding is toroidal.

15. The system of claim 14, wherein the gap between the first platform and the second platform corresponds to a housing of the toroidal primary winding and the toroidal second winding.

16. The system of claim 8, wherein the device is a light detection and ranging (LIDAR) device.

17. The system of claim 8, wherein the device is a second device, the system further comprising:
   a first device, wherein the second device is mounted on the first device via the second platform and the first platform, and wherein the second device receives power from the first device via the LLC resonant power converter.

18. The system of claim 17, wherein the first device corresponds to a vehicle, and wherein the first platform is coupled to a portion of the vehicle.

19. The system of claim 17, wherein the first device comprises a common power bus configured to provide a common voltage to a plurality of electrical components, wherein the wherein the LLC resonant power converter has a first circuit associated with the primary winding and a second circuit associated with the secondary winding, wherein the first circuit comprises a pre-regulator configured to alter the common voltage prior to powering the second device.

20. A light detection and ranging (LIDAR) device mounted to a structure comprising:
   a first platform coupled to a structure;
   a second platform spaced apart from the first platform by a gap, wherein the second platform is configured to rotate relative to the first platform; and
   an LLC resonant power converter configured to operate the LIDAR device at a unity gain operating point and in an open loop mode without feedback control, wherein the LLC resonant power converter comprises a transformer that has a primary winding and a secondary winding, wherein the primary winding is disposed on the first platform, wherein the secondary winding is disposed on the second platform, and wherein the primary winding is configured to transmit a wireless power signal to the secondary winding across the gap separating the first platform and a second platform.

\* \* \* \* \*